Patented June 12, 1928.

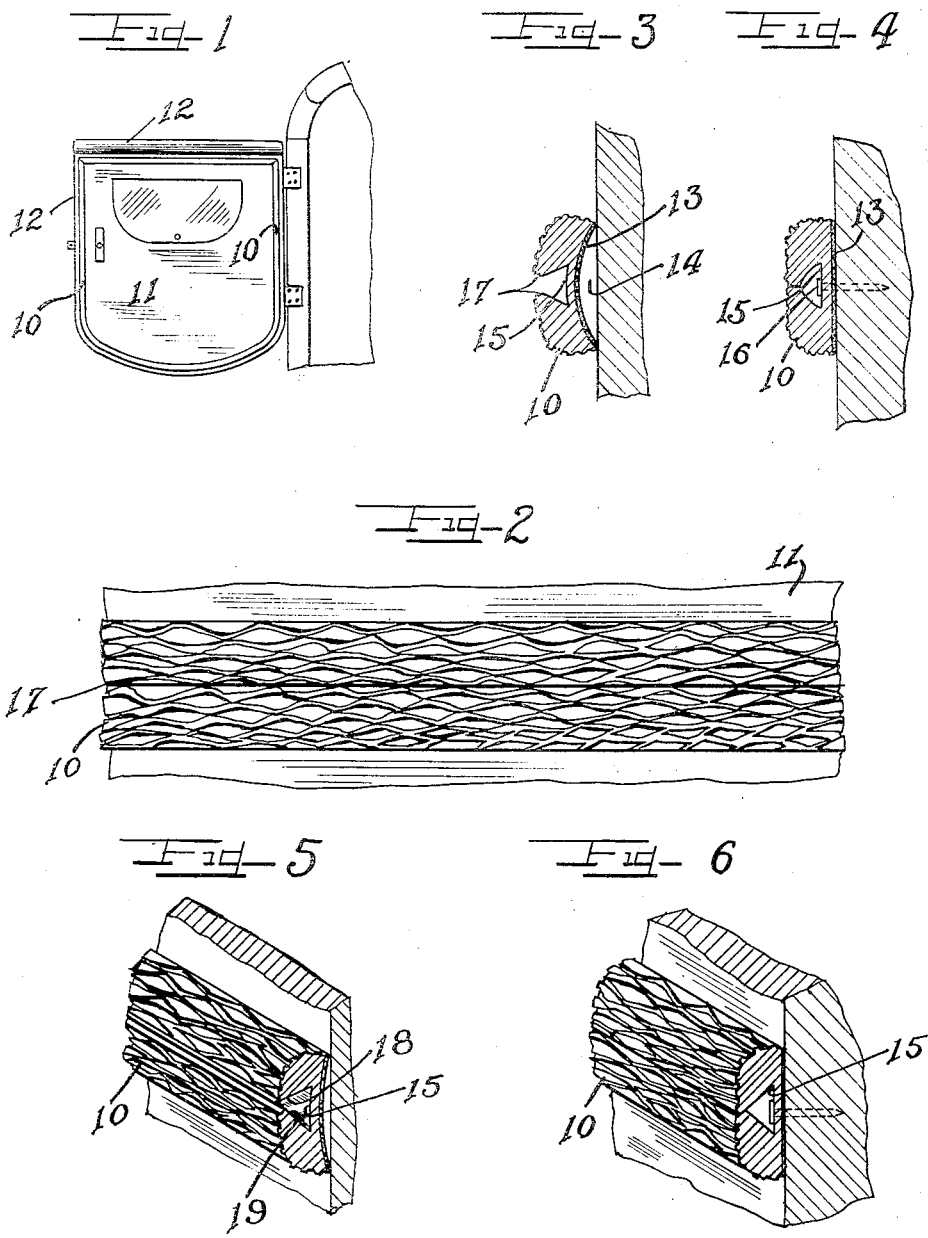

1,673,142

UNITED STATES PATENT OFFICE.

GEORGE B. DRYDEN AND REES BEYNON, OF CHICAGO, ILLINOIS, ASSIGNORS TO DRYDEN RUBBER COMPANY, A CORPORATION OF ILLINOIS.

MOLDING.

Application filed June 12, 1924. Serial No. 719,456.

This invention relates to a molding or trim for covering the edges of upholstery and the like such for example as the linings of a vehicle body.

It is an object of this invention to provide an improved strip molding having a longitudinal groove to receive the securing means, said groove having overhanging edges adapted to close together above the securing means to conceal the latter.

It is also an object of this invention to provide an improved molding, having means concealing the fastening nails, which will be economical to manufacture and rapid and cheap of application, by avoiding auxiliary covering means for the nail heads and permitting rapid insertion thereof at the desired places.

It is a further object of this invention to provide an improved strip molding of the type described wherein the act of nailing the molding in place seals the edges of the molding against the surface to which it is secured and at the same time closes a slot provided to receive the nail heads.

Other and further important objects of this invention will be apparent from the disclosures in the specification and the accompanying drawings.

This invention (in a preferred form) is illustrated in the drawings and hereinafter more fully described.

On the drawings:—

Figure 1 is a fragmentary view of a vehicle body to which the molding of this invention is applied.

Figure 2 is an enlarged view of a strip of molding as attached to the surface thereof.

Figure 3 is a section of the molding before nailing in place.

Figure 4 is a section similar to Figure 3 with the molding nailed in place.

Figure 5 is a perspective section of a slightly modified form prior to nailing in place.

Figure 6 is a section similar to Figure 5 after the molding has been fastened down.

As shown on the drawings:—

Figure 1 is intended to illustrate the use of the molding 10 to be described hereinafter as an edging for the lining 11 of a vehicle door 12, shown open in the figure. A larger size of similar molding may also be used along the top edge of the door and adjacent parts of the vehicle body, as well as in other suitable locations. The molding is used both as a trim for covering the edges of the lining or upholstery and as a cover for the tacks used to hold the upholstery in place.

The molding proper as illustrated comprises a substantially flat strip 10 with rounded corners, of a general outline somewhat resembling so called half round molding. This molding strip is preferably formed of molded rubber and may be grained and colored to imitate leather or to harmonize with the particular fabric it is to be used upon. The back surface of the molding is covered by canvas 13 molded in place with an arcuate or concave surface as indicated at 14 in Figure 3.

A groove or slot 15 is formed centrally of the exposed surface of the molding and is of approximate trapezoidal form when the molding is unconstrained, thereby providing a groove wide at the bottom to receive the heads of fastening means such as the nails 16, the groove tapering to overhanging blunt pointed edges 17 having plane mating surfaces which are spaced apart appreciably in the unsecured molding to permit ready insertion of the nails.

In Figures 3 and 4 the edges 17 on either side of the groove are identical, and nailing the molding in place distorts or smooths out the concave back of the molding, placing the extreme edges thereof under compression, and at the same time closes the edges of the groove, bringing the plane surfaces together and places them under appreciable pressure so that the groove is completely covered at the surface while leaving space for the nail heads underneath the edges 17.

In the modification of Figures 5 and 6 the plane surfaces of the edges of the groove 15 are formed so as to overlap upon closing. As shown the upper edge 18 overlaps the lower edge 19 for an appreciable distance and thereby tends to prevent access of water to the groove if the molding is assembled in a vertical position.

It is to be noted that by providing a continuous groove the nails may be placed with regard to framing joints in the article to which the molding is attached and the spacing of nails can be varied to suit the exigencies of the installation.

We are aware that many changes may be made, and numerous details of construction may be varied through a wide range without departing from the principles of this invention, and we therefore do not purpose limiting the patent granted hereon, otherwise than necessitated by the prior art.

We claim as our invention:

1. A strip molding formed of resilient material with an arcuate back and a normally open triangular groove in the face thereof, the overhanging edges of the groove being formed with plane surfaces adapted to abut when the molding is distorted by driving nails in the groove.

2. A strip molding formed of resilient material with an arcuate back and a normally open triangular groove in the face thereof, the overhanging edges of the groove being formed with plain surfaces adapted to abut in flatwise overlapping relation when the molding is distorted by driving nails therethrough within the groove.

In testimony whereof we have hereunto subscribed our names.

GEORGE B. DRYDEN.
REES BEYNON.